United States Patent Office 3,672,805
Patented June 27, 1972

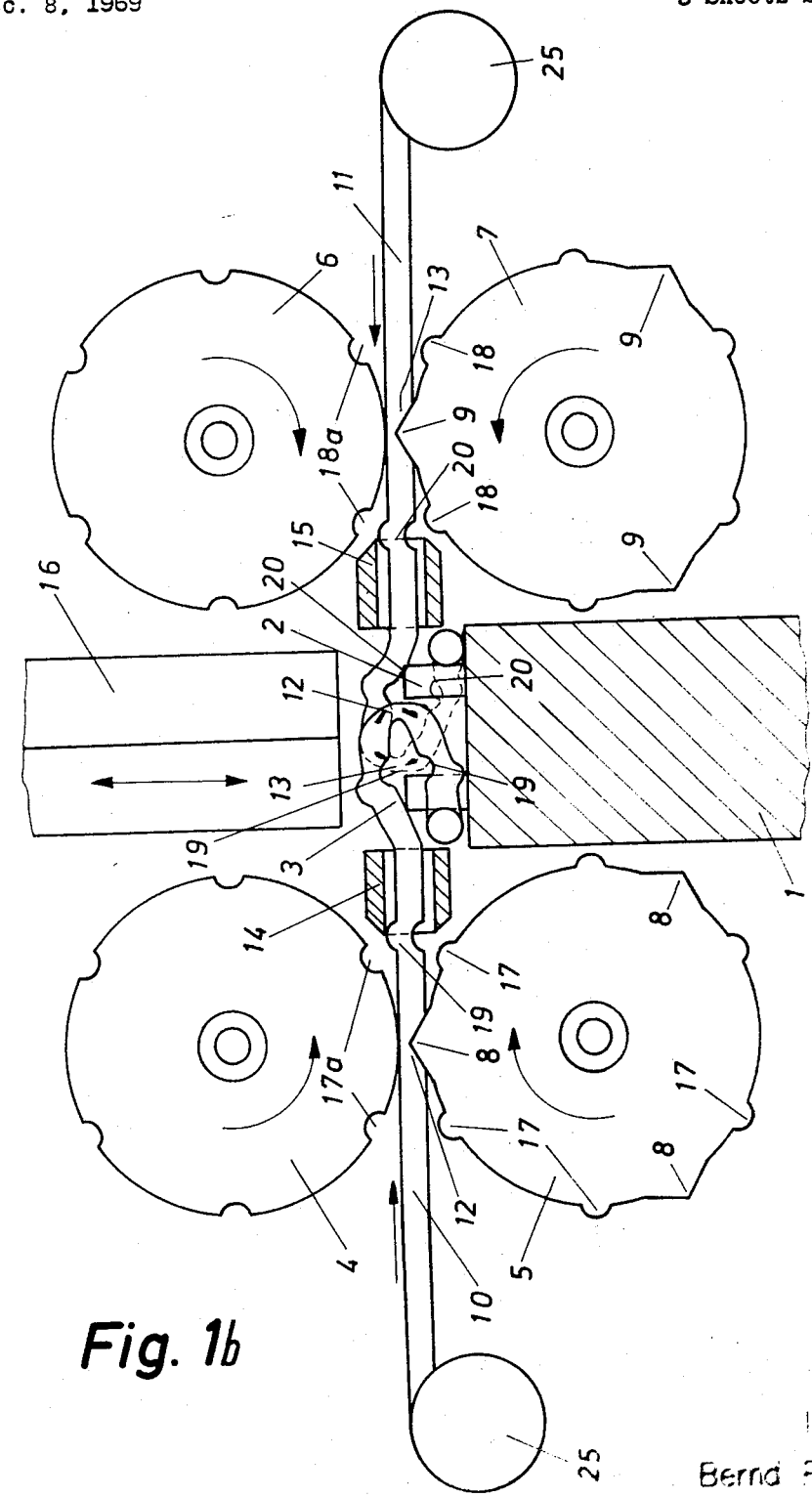

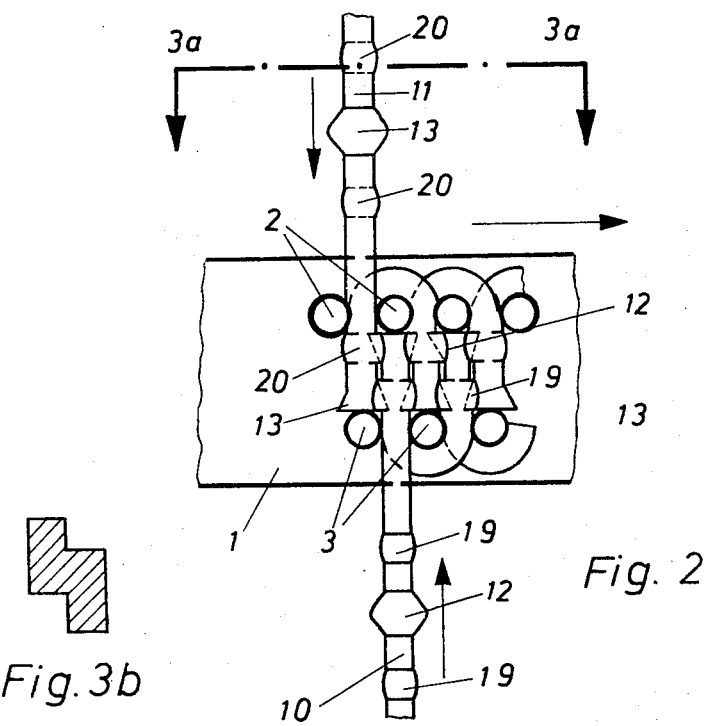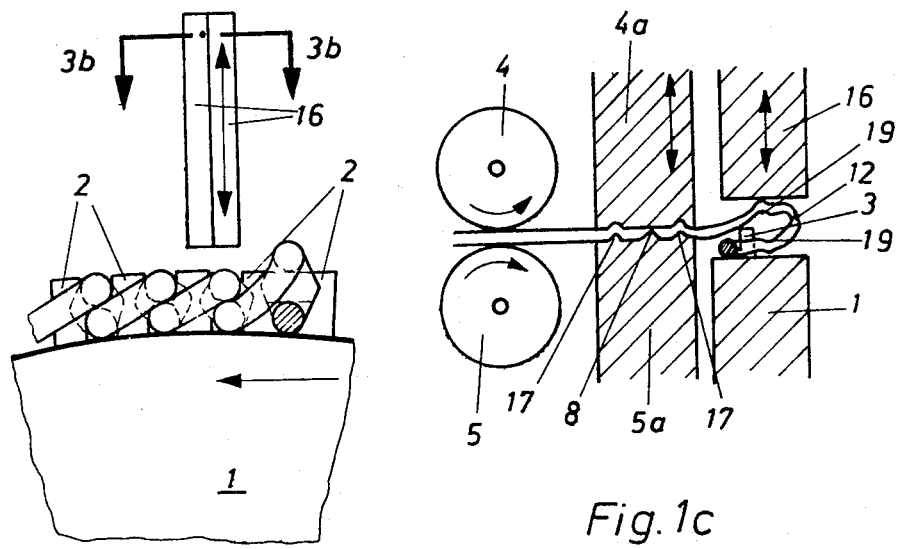

3,672,805
APPARATUS FOR FORMING A PLASTIC ARTICLE
Bernd Porepp, Am Rebberg 16, Wangen 7764, Germany
Filed Dec. 8, 1969, Ser. No. 883,251
Int. Cl. B29d 5/00
U.S. Cl. 425—391
5 Claims

ABSTRACT OF THE DISCLOSURE

A method and apparatus for making continuous coupling elements for slide fasteners. A synthetic thread of a thermosetting material is advanced axially toward radially outwardly extending guide pins or teeth on the periphery of a cylindrical disc mounted for step-by-step rotation. The synthetic thread is advanced a length sufficient to form a loop of a helical coil, after which the cylindrical disc is advanced one step, or one guide pin. The synthetic thread is advanced by means of a pair of rollers which have means on their periphery or which coact with stamping tools to deform the synthetic thread at certain points and give it a proper shape. The shaped thread will provide a loop having a deformed coupling surface at its apex and deformed engaging surfaces for the coupling surfaces of a matching coupling element at the loop base. After a loop has been formed and advanced, it is stamped flat by a reciprocating stamping device and is then heated so as to become set. The cylindrical disc may also be provided with an additional set of guide pins on its periphery, offset from the first set of guide pins, so that two continuous coupling elements may be formed in engaging relationship simultaneously.

BACKGROUND OF THE INVENTION

The present invention relates to a method and apparatus for forming continuous coupling elements for slide fasteners from a shaped plastic thread. The plastic thread is shaped into deformed helical springs, or the like, having adjacent helical sections with stamped-on coupling surfaces extending one above the other in a rearward underlapping fashion. These slide fasteners are particularly desirable because of their resistance to becoming disconnected.

It is known to form continuous coupling elements for slide fasteners in the form of helical springs, meanders, or the like, by having a shaped thread shot on a strip weaving loom as a woof element, in addition to the textile woof and warp threads, through waft thread compartments and guiding it at one edge of the strip about a reversible mandrel and having it shot back in such a manner that freely projecting loops are formed on the strip edge. The shaped thread is provided with flattened areas that provide coupling surfaces on the loops. These flattened areas are formed, for example, on a portion of the thread before it is woven in.

Another known method of forming continuous coupling elements for slide fasteners uses shaped threads provided with "stamped-on" coupling surfaces, this means surfaces deformed by stamping. This shaped thread is wound on a stationary mandrel to form a helical spring, the windings of which are properly spaced thereupon for forming a row of slide fastener members. The position of the windings is set by applying heat. The slide fastener members are then sewn onto a supporting strip.

It is further known in the art to arrange a shaped synthetic strand into meander shape by use of a thread guide which is moving back and forth through the successive gaps or recesses of a toothed wheel. The meander thus obtained is provided on its longitudinal center line with deformations which serve as coupling surfaces. The meander is then deformed about its longitudinal center line into a U-shaped pattern and attached to a supporting strip.

It is further known to guide a shaped synthetic thread through one recess each of a toothed wheel by means of a thread guide. The thread is guided about a guide pin in order to obtain a loop and is then guided back through the same recess; then a stamping device acts in cooperation with the guide pin to stamp a coupling surface at the apex of the loop. Upon the return of the thread, the toothed wheel is advanced one step, or one tooth, to form a rearwardly connecting loop, and the above sequence is repeated. This results in the formation of a continuous helical row of slide fastener members, the helices of which are provided with a coupling loop extending into helical portions one above the other in shingle, or overlapping, fashion.

Another prior method guides a shaped synthetic thread by means of a thread guide through a recess, or die, in the teeth of a toothed wheel adjacent to the face of the tooth so that the thread receives a cross-sectional deformation which serves as a coupling surface. The thread is then folded back about the deformation through the same recess in the teeth of the toothed wheel, whereby the deformations serving as the coupling surface prevent the thread from being pulled through the recess. The legs of the windings, one being immediately above the other, are then guided by means of the toothed wheel, which is advanced one tooth, about the next successive tooth to form the rearwardly connected loops, whereupon the sequence is repeated. The result is a particularly flat slide fastener.

SUMMARY OF THE INVENTION

An object of the present invention is to provide a method of and apparatus for forming slide fasteners made of flat, helical springs or the like, which is simplified over the previous methods and apparatus set out above. This object is achieved by the use of devices which are of particularly simple construction and which can be easily driven and controlled.

The method according to the present invention permits the use of a shaped synthetic thread provided with deformations, or flattened areas, which widen the thread and form the coupling surfaces. The thread is used with a base element which can be advanced step by step. This base element has at least one row of outwardly extending guide pins or teeth which correspond in thickness and spacing to the sections of the coupling elements. A section of a coupling element as used herein is one helical coil. A length of the shaped thread sufficient to form a helical loop is advanced between two of the guide pins so as to form a helical loop which has a coupling surface at its apex and the legs of its windings on top of one another. When the base element is advanced by one guide pin, the previously formed loop is pressed flat by a pressing device and the shaped thread is again advanced between the next two guide pins. The flattened helical spring windings are fed into a guide channel provided with heat for setting the windings.

The present method assures that the length of shaped thread advanced will be formed into a helical loop without any additional means acting upon it. The formed loop has a coupling surface at its apex and is pressed flat by means of a simple pressing device operating perpendicularly to the base element.

It is also within the scope of the present invention to simultaneously form two rows of slide fastened coupling elements in coupled engagement. This is accomplished by providing a second row of guide pins on the base element which are fed a second shaped thread in the opposite direction to the first shaped thread. The second row of guide pins is staggered with respect to the first row; the pins of each row being substantially in the middle of the spacing between the pins in the other row.

In order to prevent a lateral displacement of two mating continuous coupling elements formed and placed into engagement according to the method of the present invention, it is possible to use slightly flattened, or deformed, areas preceding and/or following the stamped-on coupling surfaces in the manner set out in application Ser. No. 806,620.

These small impressions are arranged so that they are at the inner engaging area for the coupling surfaces of the opposite coupling element in the formed windings.

Apparatus is provided for carrying out the method according to the present invention. In this apparatus, the guide pins are arranged on the circumference of a rotatably mounted cylindrical disc which serves as the base element. The guide pins are sized and spaced according to the size of a section of the slide fastener coupling elements. A pair of opposed rollers are arranged on one side of the rotating disc. These rollers are mounted for rotation so that their axes are at right angles to the axis of the rotating disc. These rollers feed the threads between the guide pins of the rotating disc and shape the threads simultaneously or this shaping is performed by shaping tools lying behind the rollers. The rotating disc is driven in a step-by-step manner, so that the disc is advanced one step, or one pin, as soon as the rollers have formed a helical loop.

The apparatus for carrying out the present method may also have two rows of guide pins on the circumference of the rotating disc and two pairs of rollers feeding two synthetic threads into the guide pins.

The apparatus for carrying out the present method operates exclusively with rotating and reciprocating motion and, thereby, achieves a substantial simplification over previous devices. These previous devices required, in addition to reciprocating movement of components, movements demanding special controls. The present apparatus further permits a substantially increased work output, since the diameter of the rotating disc may be made as large as desired. A large rotating disc also means that a heatable housing providing a sufficient heating period for the setting of the continuous coupling element, or elements, is possible. This is true even when the formation of the helical loops is carried out at very high speeds.

BRIEF DESCRIPTION OF THE DRAWING

FIG. 1b is a schematic front elevational view, partly in cross section, showing a portion of the apparatus of FIG. 1a.

FIG. 1c is a schematic front elevational view partly in cross section showing a changed apparatus of FIG. 1b for forming only one row of slide fastener coupling elements.

FIG. 2 is a schematic top view of a part of the apparatus of FIG. 1a.

FIG. 3a is a schematic, cross-sectional view taken generally along line 3—3 of FIG. 2.

FIG. 3b is a cross-sectional view of element 16 taken generally along line 3a—3a of FIG. 3.

DESCRIPTION OF THE PREFERRED EMBODIMENTS

Figure 1A:
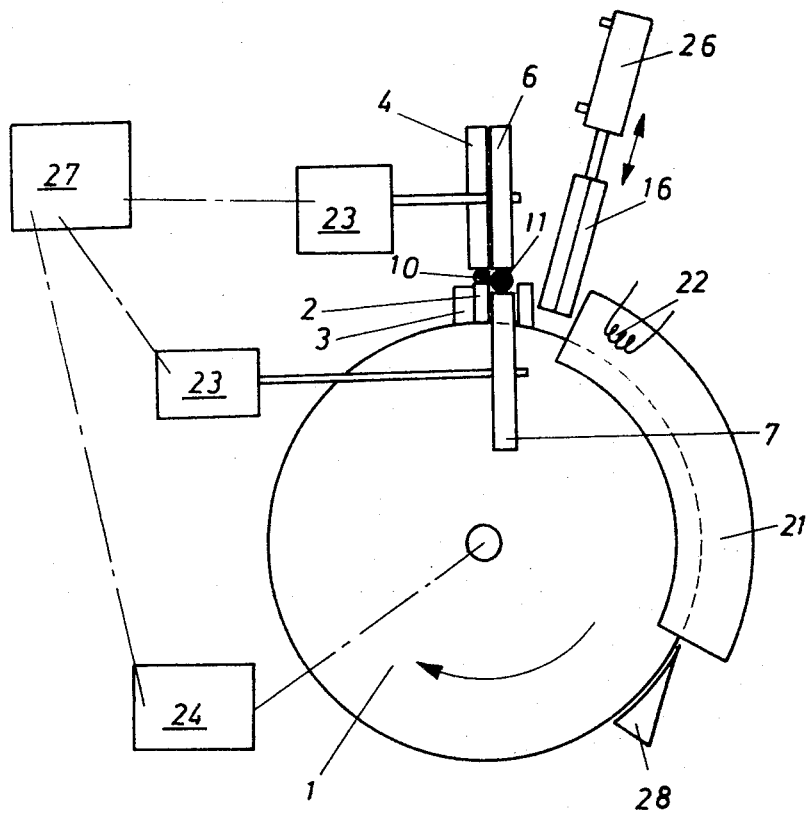
FIG. 1a is a schematic side elevational view partly in cross section, of an apparatus for carrying out the method of the present invention.

FIG. 1a shows a device for carrying out the method according to the present invention, which device includes a rotating disc 1 having rows of pins 2 and 3 or teeth arranged upon its circumference. The spacing and diameter of the pins 2 and 3 are determined by the desired size of the sections of the coupling element and the diameter of the synthetic thread.

Disc 1, a shown in FIG. 1a, is mounted for rotation in a plane perpendicular to the drawing, into the drawing in FIG. 1b, and is rotated by any suitable, well-known, sequential, or step-by-step, drive means, such as an electric motor with a Geneva drive. Such a drive means is shown schematically in FIG. 1a and is indicated as 24. The sequential drive means 24 is designed so that the disc 1 will rotate the distance between the pins in each step. Guide pins 3 are arranged in staggered relationship with respect to guide pins 2 so that each pin is located approximately equidistant between a pair of pins in the other row.

As shown in FIGS. 1a and 1b, a pair of rollers 4, 5 and 6, 7 are located adjacent each radial face of disc 1 near its periphery, and are in a staggered relationship with each other so that they may simultaneously feed threads 10 and 11 between a pair of staggered pins 2 and 3, respectively. Each roller in the pairs of rollers 4, 5 and 6, 7 is contrarotated with respect to the other by means of suitable, well-known drives 23. Drives 23 may be any suitable drive means, such as an electric motor, and may rotate the rollers either intermittently or continuously. If the rollers 4, 5 and 6, 7 are rotated intermittently, suitable well-known means for controlling their operation in conjunction with the step-by-step operation of the disc 1 may be used. Such control means may be timing mechanisms, and are indicated schematically by block 27 in FIG. 1a. If on the other hand, the rollers 4, 5 and 6, 7 are operated continuously, the speed of their operation is a function of the sequential cycle of disc 1.

Stamping cams 8 and 9 are provided on the periphery of rollers 5 and 7, respectively. These stamping cams 8 and 9 flatten the synthetic threads 10 and 11 being fed by the rollers 4, 5 and 6, 7, so as to provide coupling surfaces 12 and 13.

After passing between the pairs of rollers 4, 5 and 6, 7 the threads 10 and 11, which may be of a suitable thermosetting material, enter guides 14 and 15, respectively. Guides 14 and 15 may have the configuration of a short sleeve, as is shown in FIG. 1b, and are arranged so that they terminate at a predetermined point which will form a gap between guides 14 and 15 and guide pins 2 and 3, respectively. This gap must be at least as great as the diameter of the thread. As can be seen from FIG. 1b, the rollers 4, 5 and 6, 7 and the guides 14 and 15 are arranged so that the threads 10 and 11 leave the guides 14 and 15, respectively, at a point just above the periphery of the disc 1.

According to FIG. 1c the stamping cams 8 and 9 are provided on the opposite faces of stamping tools 4a and 5a arranged behind the feeding rollers 4 and 5. In this case the same stamping tools may be provided on the other side of the disc 1 if two threads are guided to the two rows of pins.

A stamping device 16 is arranged over the periphery of the disc 1 and is mounted so as to have a reciprocating motion in the radial direction of disc 1. The stamping device 16 serves to press the formed helical loops flat and is located one advance step, or the thickness of one guide pin 2, 3, from the feed-in point of threads 10 and 11. The stamping device 16 has a staggered configuration, as shown in FIG. 3b, so that it can fit into the space between two guide pins 2 and 3. The drive means for stamping device 16 may be any suitable, well-known reciprocating drive means, such as a double-acting fluid piston and cylinder. It is shown schematically in FIG. 1 and indicated by the numeral 26.

A housing 21 and a suitable heating means, such as an electric heating element 22, are mounted in any well-known manner around at least a portion of disc 1 so that the flattened coils may be heated and set. Wedge 28 is mounted in a well-known manner to strip the set coupling elements from the disc 1.

The operation of the apparatus set out above will now be described. The two pairs of rollers 4, 5 and 6, 7, which simultaneously act as stamping rollers or coact with stamping tools 4a and 5a to deform the threads 10 and 11, advance threads 10 and 11 respectively, into the space formed between two successive guide pins 2 and 3, respectively. The threads 10 and 11 are wound off coils 25 and 25', respectively, which are mounted in any well-known manner. If an intermittent drive for the rollers 4, 5 and 6, 7 is used as set out above, the rollers must rotate enough to wind sufficent thread of the coils to form a helical loop. By proper dimensioning of the various elements, the coupling surfaces 12 and 13, which have been formed by the stamping cams 8 and 9 as the threads 10 and 11 passed between the rollers, will be at the apex of each loop. The coupling surfaces also aid in the formation of the loops, since this area is weakened along the flattened surface. During the forward movement of the said length of the threads provided with the coupling surfaces the end part of the previous formed loops will hold fast the first part of the now to be formed loops and thereby the lengths pushed forwardly by rolls will form the loops with the coupling surfaces in the apex. During this operation the coupling surfaces, forming broadening parts of the threads move forwardly above the ends of the pins.

As soon as two helical loops have been formed by threads 10 and 11, respectively, disc 1 is advanced one step, or one guide pin thickness, and roller pairs 4, 5 and 6, 7 simultaneously advance thread for two more helical loops. As the disc 1 advances, the threads form a loop about the outside of the guide pins 2 and 3, respectively, that are away from the direction of motion of disc 1. In this manner, a continuous series of helical loops is formed. As can be seen from the drawing, particularly FIGS. 1b, 2 and 3a, the helical loops are underlapping the one behind, so as to provide a shingle effect.

Coupling surfaces 12 and 13 of the helical loops each extend between the legs of the opposing coupling elements. As shown particularly in FIGS. 1b and 3a, inner recesses 19 and 20 are formed in threads 10 and 11, respectively, by projections 17 and 18 on rollers 5 and 7 or stamping tools 4a and 5a, respectively. Projections 17 and 18 are of smaller dimensions than the stamping cams 8 and 9, and fit into correspondingly provided recesses 17a and 18a in rollers 4 and 6, respectively. Projections 17 and 18, when cooperating with recesses 17a and 18a, form deformations 19 and 20 in the threads 10 and 11, respectively.

After each helical loop is formed and is advanced by a movement of the disc 1, it is pressed flat by the stamping device 16, which is reciprocated toward the axis of disc 1 at this time. After being pressed flat, the rows of coupling elements appear as in FIGS. 2 and 3a, with flattened surfaces 19 and 20 providing engagement areas for the coupling surfaces 12 and 13 of the opposing row of coupling elements.

After the helical coils have been pressed flat by stamping device 16, they are fed into the housing 21 where they are heated so as to set. After sufficient setting, the helices are lifted one by one by means of well-known arrangements, such as take-up wedges 28 or the like, from the area of the guide pins 2 and 3. The continuous coupling elements are now ready to be attached to a supporting strip in a conventional manner, such as by sewing.

It is possible to make various modifications of the apparatus set out above. As mentioned above, only one row of coupling elements need be formed at a time. In this event, the disc 1 is only provided with a single row of guide pins and only one pair of rollers is necessary. As a result of this, the production of a slide fastener will require two devices of this kind. Another possible embodiment of the invention is to have the pairs of rollers merely feed the thread and have separate stamping devices to deform the thread where desired as above mentioned.

It will be understood that the above description of the present invention is susceptible to various modifications, changes and adaptations and the same are intended to be comprehended within the meaning and range of equivalents of the appended claims.

I claim:

1. An apparatus for producing rows of slide fastener members from thermoplastic synthetic threads in the form of deformed flattened helical springs, comprising: a roller disc including a plurality of guide pins spaced apart by gaps in correspondence with the thickness of the synthetic thread, said roller disc being mounted for periodic rotation by a drive means; an advancing device disposed on one side of said disc, said advancing device advancing the synthetic thread, when said disc is stationary into a developed loop of a slide fastener member in the direction of a pin gap and transverse to the circumference of said disc; stamping means provided on the same side of said roller disc as said advancing device, said stamping means being adapted to stamp the slide fastener member to form a coupling surface which widens the thread; a stamping device supported to operate radially against the periphery of said roller disc so that a loop formed in the area of said roller disc between two guide pins is flattened; and a heated housing which receives the flattened slide fastener members.

2. Apparatus as defined in claim 1 for producing two rows of coupled slide fastener members, wherein said roller disc is provided along its periphery with two rows of guide pins which are offset with respect to one another in the peripheral direction of said roller disc, by at least the dimension of one pin in that direction, and wherein one said advancing device and stamping means are provided on each side of said roller disc, each of said advancing devices advancing a synthetic thread toward opposite sides of said roller disc, the advancing direction of said threads being offset with respect to one another, in the peripheral direction of said roller disc, by an amount equal to the offset between said two rows pins, said threads winding in such a manner that the loops formed between said two rows of pins overlap one another.

3. Apparatus as defined in claim 2, wherein each said advancing device includes a pair of transporting rollers, with one roller of each pair of rollers being provided on its periphery with stamping cams for producing the coupling surfaces for the looped thread, the spacing of said cams corresponding to a developed loop of a slide fastener member.

4. Apparatus as defined in claim 3, wherein said one roller of each pair of rollers is further provided with stamping projections of lower height than said stamping cams, said stamping projections and said stamping cams arranged about the periphery of said one roller in an alternating array.

5. Apparatus as defined in claim 2, wherein said stamping means are provided with stamping cams and stamping projections, with said stamping projections being of lower height than said stamping cams and being disposed on either side of each stamping cam.

References Cited

UNITED STATES PATENTS 3,197,537    7/1965    Hansen    18—1 Z
3,255,288    6/1966    Steingruebner    18—1 ZX
3,541,638    11/1970    Porpepp    18—1 Z J. SPENCER OVERHOLSER, Primary Examiner L. R. FRYE, Assistant Examiner U.S. Cl. X.R.

264—281, 287; 425—814